United States Patent [19]

Tinnerman

[11] 3,775,790
[45] Dec. 4, 1973

[54] FASTENING MEANS FOR A ROTATIONAL FASTENER AND METHOD

[76] Inventor: George A. Tinnerman, 3600 Stewart Ave., Lakewood, Ohio 33133

[22] Filed: Sept. 24, 1971

[21] Appl. No.: 183,662

Related U.S. Application Data

[60] Continuation of Ser. No. 6,153, Jan. 27, 1970, abandoned, which is a division of Ser. No. 640,213, March 22, 1967, Pat. No. 3,491,646.

[52] U.S. Cl. ................................................. 10/86 F
[51] Int. Cl. ...................... B21d 53/20, B21d 53/24
[58] Field of Search .......................... 10/86 R, 86 F; 85/32, 32 V; 72/377, 379

[56] References Cited
UNITED STATES PATENTS

| | | | |
|---|---|---|---|
| 561,913 | 6/1896 | Paquette | 85/32 V |
| 2,723,584 | 11/1955 | Parker | 85/32 V |
| 2,832,972 | 5/1958 | Richards | 10/86 F |
| 2,896,495 | 7/1959 | Crawford | 85/32 V |
| 3,206,967 | 9/1965 | Holton | 10/86 R |
| 3,345,899 | 10/1967 | Fiddler | 85/32 V |
| 3,368,444 | 2/1968 | Holton | 10/86 R |
| 3,387,481 | 6/1968 | Harvey | 72/377 |
| 3,160,189 | 12/1964 | Hughes | 85/32 R |
| 2,002,671 | 5/1935 | McLaughlin | 10/86 F |

Primary Examiner—Charles W. Lanham
Assistant Examiner—E. M. Combs
Attorney—Revere B. Gurley

[57] ABSTRACT

The rotational fastener such as a nut element has an aperture with helical ribs on the circumferential walls spaced by breaks in the periphery of the aperture. These helical ribs commence at the breaks near one surface of the element and extend axially and circumferentially, the ribs increasing in radial height with increasing distance from the one surface. The ends of the ribs serve as teeth for engagement with a shank and cut grooves in the shank.

5 Claims, 10 Drawing Figures

PATENTED DEC 4 1973 3,775,790

INVENTOR
GEORGE A. TINNERMAN

BY *Russ B. Seely*
ATTORNEY

INVENTOR
GEORGE A. TINNERMAN

BY *Rowen B. Senley*
ATTORNEY

FASTENING MEANS FOR A ROTATIONAL FASTENER AND METHOD

This is a continuation of application Ser. No. 6,153, filed Jan. 27, 1970, now abandoned, which is a division of application Ser. No. 640,213, filed Mar. 22, 1967, now U.S. Pat. No. 3,491,646.

These ribs are formed by swaging the edges of the aperture between the breaks axially and radially inwardly, using a punch element having helical surfaces to swage the ribs. Two opposed punches may be used from opposite sides of a sheet or plate element, and two sets of ribs are formed from the two sides. Preferably the ribs of two sets lie in the same helical paths.

A thickened boss may be formed for the fastening means if a sheet material is too thick. Two punch elements having circumferential shearing edges and tapered sides internally of the edges are opposed to each other and engage opposite sides of a sheet element to shear the material about the periphery of the punch element which then compresses the material radially to expand it axially. The aperture may be made in this boss and ribs formed therein as described above.

The fastener element and shank may be secured more firmly against loosening or reverse rotation by an axial impact on the shank to set the teeth of the ribs into the shank, thus increasing the resistance to reverse rotation.

SUMMARY OF INVENTION

This invention relates to fastening means on an apertured article to engage a shank by relative rotation, and a method of forming such fastening means. The article, illustrated as a sheet or plate, has an aperture which is formed with cylindrical wall portions spaced by breaks or notches. The edges of said cylindrical wall portions adjacent one surface between the notches are swaged radially and axially to form helical ribs or partial threads on the wall portions between the notches. These ribs are formed by a punch element having helical end surfaces engaging the edges between the notches.

Two sets of partial threads or ribs may be formed by swaging on both sides of the plate or nut element, and the ribs of each set may lie in the same helical paths as the ribs of the other set. An article having a set or plurality of sets of such partial threads or ribs, when rotated on a smooth shank or stud, may cut grooves in the stud, the low end of the rib at the adjoining break forming a tooth for cutting the groove. If a second set of ribs is formed on the same article from the opposite side, the second set when in the same helical paths cuts the same grooves deeper, as the higher ends of the ribs act as the cutting teeth.

A thin sheet element may be thickened sufficiently for forming partial threads by thickening at one point. A pair of opposed punch elements having peripheral cutting edges partially shear through the material, and compact the surrounded material radially to increase its thickness.

This application is a division of my application Ser. No. 640,213, filed Mar. 22, 1967. DRAWINGS FIG. 1 is a plan view of an apertured fastener element to be formed with the fastening means of this invention.

DESCRIPTION OF THE INVENTION

The fastener or nut element is shown in its simplest form in FIGS. 1 to 4. A plate of sheet member 10 of mild steel has an opening 11 punched therein, this opening having one or more cylindrical arcuate surfaces 12 concentric with the axis, the ends of which are separated by notches or breaks 13 in the periphery of the opening.

Figure 3:
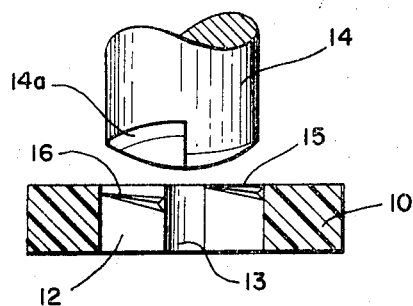
FIG. 3 is a cross section on line 3—3 of FIG. 2, showing the punch element used to form the fastening means.

The fastening means in this article 10 are partial threads or helical ribs formed on the inner arcuate surfaces 12 of the nut element 10 by a punch member 14 as shown in FIG. 3. The end of this punch member 14 has a continuous wall with an outer diameter slightly greater than the diameter of opening 11 across arcuate surfaces 12. The end has one or more identical helical surfaces 14a, which intersect the continuous wall in helical cutting edges corresponding in circumferential extent to the arcuate surfaces 12.

A nut element 10 is placed on an anvil or base, located by a pin or boss, if desired, and the punch member 14 is then driven into opening 11, so that the helical surfaces 14a of the punch member swage or deform the corners or spaced edge portions of arcuate surfaces 12 into helical formations corresponding to partial threads 15, 16.

In the specific form shown to illustrate the principles of the invention, the punch member with identical helical surfaces forms identical threads or ribs 15, 16 on the same level or equal distances from the surface of article 10. These partial threads, therefore, lie in spaced helical paths and correspond to spaced threads.

Figure 1:
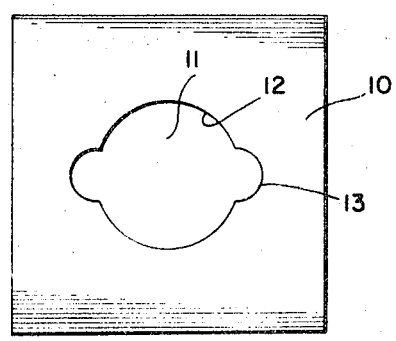
Figure 2:
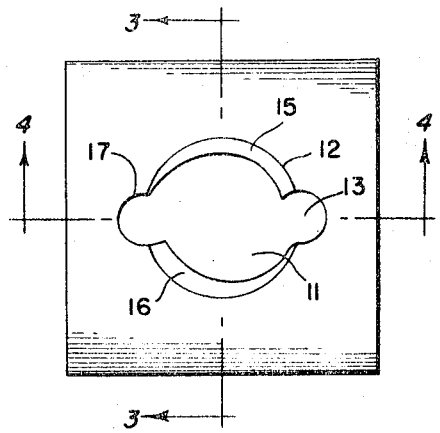
FIG. 2 is a plan view of the element of FIG. 1 with the fastening means formed therein.
Figure 4:
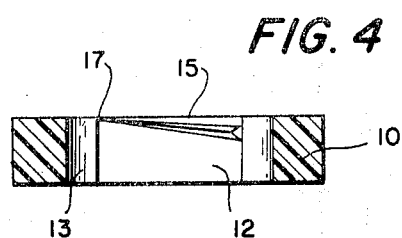
FIG. 4 is a cross section on line 4—4 of FIG. 2.
Figure 5:
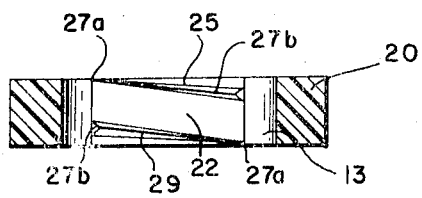
FIG. 5 is a cross section of a modification, on line 5—5 of FIG. 7.
Figure 6:
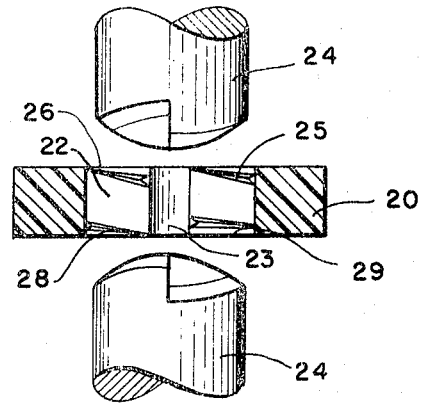
FIG. 6 is another cross section on line 6—6 of FIG. 7, showing the punch elements used to form the fastening elements.
Figure 7:
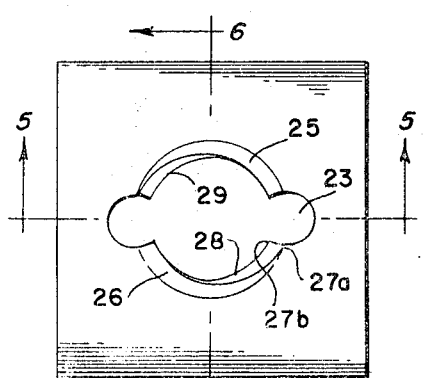
FIG. 7 is a plan view of the modification of FIG. 5.

After the nut element is formed by the punch member 14, as shown in FIGS. 2, 3 and 4, it may be hardened, if desired, as by carburizing, and the ends of the partial threads will form cutting teeth for grooving a shank on which the article such as a nut element is rotated. The leading end 17 of each partial thread or rib engages the shank to cut a groove in the shank, the partial thread following in and deepening the groove. As the partial threads lie in spaced helical paths, the end of each partial thread acts as a cutting tooth to cut its own groove, so that the shank is formed with spaced helical grooves cut by the nut element.

It is also possible to form two sets of ribs or partial threads from opposite sides of a nut element 20 by opposed punch members 24 operating simultaneously, as shown in FIGS. 5 to 8. This formation not only provides greatly increased strength by providing the double sets of cutting threads, but may increase the strength even more due to increasing the depth of the grooves.

The nut element 20 with the arcuate surfaces 22 is held between the opposed punch members 24 which are driven into the opening and engage the arcuate surfaces 22 between notches 23. Each punch member forms a set of ribs or partial threads 25, 26 and 28, 29, respectively, equally distant from the opposite surfaces of nut element 20, so that the nut element will be the same when viewed from either side.

Figure 8:
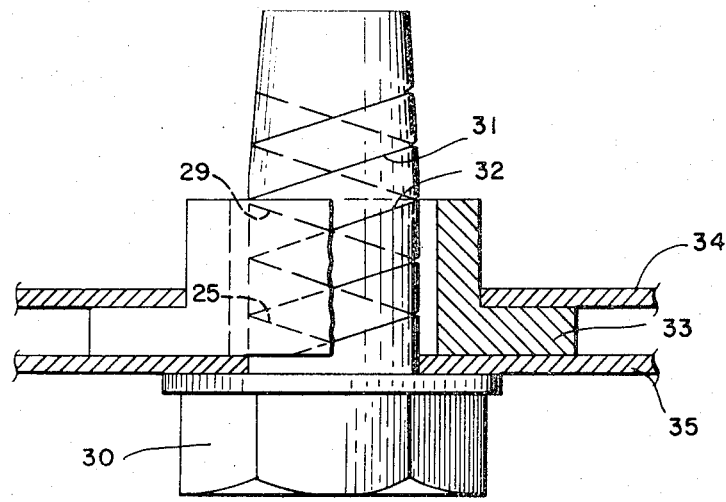
FIG. 8 is a partial cross section of a fixed fastener element applied to a rotating shank to secure panels or brackets to each other.

In FIG. 8, the stud 30 having a smooth shank is rotated to thread through the fastener element 20, the teeth and ribs forming two parallel, helical grooves 31 and 32 in the smooth shank. This fastener element 20 is staked to the panel 34, and the flanged head of the stud 30 clamps a second member 35 against the fastener element to secure members 34 and 35 together.

It is important to note that the two sets of ribs as viewed from one side are reversed, or are mirror images, so that the low ends 27a of the ribs 25, 26 on the entering side of the shank will cut initially as the shank enters the opening. When the shank then engages ribs 28, 29, the high ends 27b of the ribs engage the stud to set as cutting teeth. If the ribs of the two sets are formed in the same two spaced helical paths, it will be seen that the high ends 27b of the corresponding following ribs will continue in the grooves 31 and 32 formed in a shank 30 by the entering teeth 27a, as shown in FIG. 8. Thus partial threads or ribs 25 and 29 may lie in the same helical path, so that the rib or thread 29 will follow in the groove 31 of the shank 30 initially cut by rib or thread 25 and the low end 27a. When the shank reaches thread 29 in its axial movement, the high end 27b of thread 29 will engage in the groove, so that this cutting tooth will deepen the same groove. The result is that two spiral grooves are cut to a greater depth by operation of the second set of partial cutting threads.

A further feature of the operation of this fastening means on an article is that the low ends 27a of the ribs initially engaging the shank cut the groove at first, but the high ends 27b of these ribs engage in the groove on reverse rotation of the nut element. The high ends of the ribs will exert great pressure on the shank and will act as teeth against rotation on the stud in the opposite direction. As a result, the nut element will not become loose on the stud and is unlikely to be unscrewed by external forces or vibration.

The reverse torque may also be increased between a shank member and nut element by sharp blows on the shank to set the teeth of the ribs into the sides of the grooves in the stud. It is possible in this manner to increase substantially the resistance of the nut element to reverse rotation off the shank, and this resistance may continue for several turns of the nut element.

Figure 9:
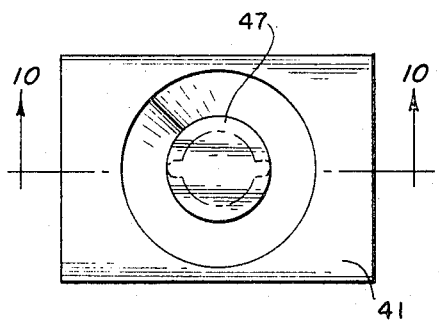
FIG. 9 is a plan view of a formation of a sheet member to be used as a fastener element.
Figure 10:
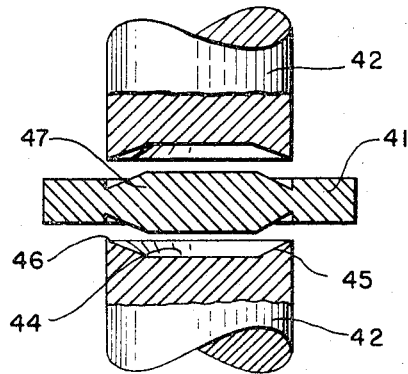
FIG. 10 is a cross section on line 10—10 of FIG. 9, showing the punch elements used in the formation of the fastener element.

In many cases, the sheet material may not be of sufficient thickness for this formation, and applicant in FIGS. 9 and 10 shows a method of thickening the material at a location where an opening is to be formed for the partial threads. The sheet member 41 is placed between two punch members 42, each of which has a cup-shaped end with a flat bottom surface 44 and a conical peripheral surface 45 adjacent the periphery, the peripheral edge 46 being sharp to constitute a cutting edge. As the two punch members approach each other, the cutting edges cut into the material on opposite sides and the conical surfaces compress the material radially between the punch members, thereby increasing the thickness at 47 between the punch members. The flattened bottom surfaces 44 may limit movement of the punch members and form the flattened surface on the boss portion 47 of the member 41.

This rotating fastener or nut element may be encapsulated in a rigid synthetic resinous plastic body, either in a molded body as shown in Ser. No. 549,880, filed May 13, 1966, or in an assembled structure as in Ser. No. 612,447, filed Jan. 27, 1967. The smooth shank preferably has a tight fit with the plastic body, so that the nut element in compressing the plastic will increase the frictional engagement with the shank. When used with a plastic base having substantial resilience, as a cup-shaped hollow base, the teeth on the nut or fastener element may be set in the grooves of the shank by sharp impact on the shank as described above, the resilient base allowing sufficient movement for this purpose. Preferably, this action takes place while the torque force is still applied to the nut, the impact with the torque force applied simultaneously interengaging the teeth on the fastener element and groove walls on the shank at the limit of rotational movement. The nut locking effect is substantial, and when combined with the resilient pressure exerted by the base, eliminates any possibility of loosening of the fastener.

I claim:

1. The method of forming fastening means on an article for engagement with a shank on relative rotation of said shank and article, comprising forming an aperture in said article with the wall of said aperture provided with at least one axially extending discontinuity to form a break in said wall with a surface extending radially outwardly from said wall, swaging the wall of said aperture radially inwardly by shaving the metal of said wall axially inwardly from the end of said aperture with a punch coaxial of said aperture having a continuous wall of greater diameter than said aperture and a helical surface on its end intersecting said wall on a helical line to form a cutting edge, said punch having a cutting edge extending completely about the periphery of the end of said punch and shaving the wall of said opening along a surface concentric to said wall and on a helical line intersecting the wall of said break to form a helical rib along the wall of said aperture with one end of said rib intersecting the radially extending surface of said break and forming an inwardly extending tooth at the intersection, the radial height of said rib increasing from said tooth and at any point being proportional to the distance of the rib from the end of the aperture.

2. The method of forming fastening means as claimed in claim 1 in which a plurality of breaks is formed in the wall of said aperture and each rib extends from one break to the next succeeding break, and said punch has a plurality of helical surfaces intersecting said continuous wall in helical cutting edges to form a plurality of ribs on said wall of said aperture, said ribs being spaced equal distances from the end of said aperture, the end of each rib farthest from the adjacent surface at its intersection with the break forming an inwardly height tooth of greater radial huight than the tooth at the other end, the corresponding end teeth of all said ribs being equal in radial height.

3. The method of forming fastening means in an article for engagement by a shank on relative rotation, comprising the steps of forming an aperture through said article with concentric arcuate walls spaced by breaks in the periphery of the aperture, moving opposed punch members into said aperture toward each other from opposite sides of said article, each punch member having a continuous wall and helical surfaces on the end intersecting said continuous wall in helical cutting edges of greater external diameter than and concentric with the concentric arcuate walls of said aperture, swaging the edges of said arcuate walls by engagement of the helical edges of each of said punch members with the edges of said arcuate walls and with the helical edges on said punch members concentric to said walls to form helical ribs on said arcuate walls, each rib extending along one wall from a break adjacent the surface of said article radially inwardly and axially toward the next break, the end of each rib nearest one surface at the intersection with the adjacent break forming an inwardly protecting tooth to engage a shank initially when inserted from the side with said one surface, the helical ribs formed by each punch member being spaced equal distances from the end of said aperture to form ribs equal in height, the helical ribs formed by opposite punch members lying in the same helical curves, so that the high end of one rib engages in the groove cut in the shank by the low end of the opposite rib.

4. The method of forming a female threaded fastener in thin, flat sheet material which comprises exerting pressure on said material at an acute angle to the surface about the periphery of a localized area by a pair of opposed punch members on opposite sides of said area which are moved toward each other to squeeze the material in said area between them, each punch member having a hollow end with a peripheral cutting edge and an inclined peripheral surface extending inwardly from said edge and axially outwardly to form said hollow end, the force exerting said pressure including a centripetal component applied to said material by said inclined surfaces on each side of said material to force the material inwardly from the periphery toward the center and thereby increase the thickness of the material in the central portion of said localized area, while reducing the thickness adjacent the periphery of the area, forming an aperture in said localized area having a cylindrical wall portion and an axial groove in said wall portion, shaving said wall of said aperture from the end of said aperture with a punch coaxial of said aperture having a continuous wall of greater diameter than said aperture and a helical surface on its end intersecting said wall on a helical line to form a cutting edge, said cutting edge extending completely about the periphery of the end of said punch and shaving the wall of said opening along a surface concentric to said wall portion and axially inwardly along an axially and circumferentially inclined line which extends to said groove to upset the metal of said wall and form a helical rib on said cylindrical wall with one end of said rib intersecting the edge of said groove to form an inwardly extending tooth at the intersection with the wall of said groove, the height of said rib being proportional along its length from said tooth to its opposite end to its distance from the end of said aperture.

5. The method of forming fastening means as claimed in claim 1, in which a plurality of breaks is formed in the wall of said aperture and the cutting edge of said punch shaves the wall of said aperture along a continuous line extending between successive breaks.

* * * * *